United States Patent
Yoshimoto

(10) Patent No.: US 6,927,551 B2
(45) Date of Patent: Aug. 9, 2005

(54) MOTOR CONTROL APPARATUS AND MOTOR CONTROL METHOD

(75) Inventor: Kantaro Yoshimoto, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1 day.

(21) Appl. No.: 10/779,612

(22) Filed: Feb. 18, 2004

(65) Prior Publication Data

US 2004/0183496 A1 Sep. 23, 2004

(30) Foreign Application Priority Data

Mar. 20, 2003 (JP) .................................... 2003-078181

(51) Int. Cl.⁷ ................................ H02P 6/10; H02P 7/00
(52) U.S. Cl. ...................... 318/715; 318/721; 318/722; 318/432; 701/41
(58) Field of Search ................................ 318/715, 802, 318/609, 437, 635, 700, 629, 432, 721, 722; 701/41, 42

(56) References Cited

U.S. PATENT DOCUMENTS

| | | | | |
|---|---|---|---|---|
| 6,329,781 B1 | * | 12/2001 | Matsui et al. ................ | 318/717 |
| 6,373,219 B1 | * | 4/2002 | Obara et al. ................. | 318/801 |
| 6,427,104 B1 | * | 7/2002 | Matsushita et al. ............ | 701/41 |
| 6,462,492 B1 | * | 10/2002 | Sakamoto et al. ........... | 318/254 |
| 6,674,262 B2 | * | 1/2004 | Kitajima et al. ............. | 318/722 |
| 6,768,280 B2 | * | 7/2004 | Kitajima ..................... | 318/432 |
| 6,861,813 B2 | * | 3/2005 | Yoshimoto et al. .......... | 318/432 |
| 2002/0097015 A1 | * | 7/2002 | Kitajima et al. ............. | 318/432 |
| 2003/0001536 A1 | * | 1/2003 | Kitajima ..................... | 318/629 |
| 2003/0030404 A1 | * | 2/2003 | Iwaji et al. .................. | 318/700 |
| 2003/0052641 A1 | * | 3/2003 | Yoshimoto et al. .......... | 318/700 |
| 2003/0090231 A1 | * | 5/2003 | Yoshimoto et al. .......... | 318/635 |
| 2003/0222612 A1 | * | 12/2003 | Matsushita ................... | 318/437 |
| 2004/0135533 A1 | * | 7/2004 | Harakawa et al. ........... | 318/609 |
| 2004/0195993 A1 | * | 10/2004 | Yoshimoto et al. .......... | 318/802 |

FOREIGN PATENT DOCUMENTS

JP    P2000-50689 A    2/2000

* cited by examiner

Primary Examiner—Paul Ip
(74) Attorney, Agent, or Firm—McDermott Will & Emery LLP

(57) ABSTRACT

A 3-phase AC current flowing to a 3-phase synchronous motor is converted through coordinate conversion to a d-axis current id and a q-axis current iq in a dq-axis coordinate system which rotates in synchronization with the motor rotation and a phase δ of a rectangular wave voltage is calculated based upon the current deviation between a q-axis current command value iq* and the q-axis current iq. A 3-phase rectangular wave voltage is generated from a DC source based upon the calculated phase δ and is applied to the 3-phase synchronous motor.

10 Claims, 7 Drawing Sheets

US 6,927,551 B2

MOTOR CONTROL APPARATUS AND MOTOR CONTROL METHOD

BACKGROUND OF THE INVENTION

1. Field of the Invention

The present invention relates to a control apparatus that controls an AC motor.

2. Description of the Related Art

The wave height value of a fundamental wave voltage can be increased and thus, the motor output in a high rotation rate range can be increased by applying a single pulse rectangular wave voltage instead of a sine wave PWM voltage when applying a voltage to an AC motor with an inverter. The phase of the voltage applied to the motor can be controlled, but the amplitude of the voltage cannot be controlled in motor control implemented by using a rectangular wave voltage, since the voltage amplitude is determined in correspondence to a DC source voltage (DC link voltage) at the inverter. For this reason, the motor torque cannot be controlled accurately through such motor control.

There is a motor control apparatus in the related art that addresses this problem by estimating the motor torque with a torque estimating instrument and controlling the voltage phase based upon the deviation between a torque command value and the estimated value (see Japanese Laid Open Patent Publication No. 2000-050689). By utilizing this motor control apparatus, a torque which corresponds to the torque command value is obtained.

SUMMARY OF THE INVENTION

However, it is difficult to achieve quick response in the torque control with the motor control apparatus in the related art described above, which controls the motor torque by feeding back the estimated value to the motor torque command value based upon the relationship between the motor torque and the voltage phase in a steady state.

The present invention provides a motor control apparatus which improves performance in controlling the torque when a synchronous motor is driven with a rectangular wave voltage.

A motor control apparatus that drives a 3-phase synchronous motor by applying a 3-phase rectangular wave voltage to the 3-phase synchronous motor in the present invention comprises a current detection device that detects a current flowing to the synchronous motor, a current conversion device that converts through a coordinate conversion the current detected by the current detection device to a d-axis current and a q-axis current in a dq-axis coordinate system which rotates in synchronization with rotation of the motor, a phase calculation device that calculates a phase of the rectangular wave voltage based upon a q-axis current deviation between a q-axis current command value and the q-axis current and a power conversion device that generates the rectangular wave voltage having the phase calculated by the phase calculation device from a DC source.

In a motor control method for driving a 3-phase synchronous motor by applying a 3-phase rectangular wave voltage, a current flowing to the synchronous motor is detected, the detected current is converted through a coordinate conversion to a d-axis current and a q-axis current in a dq-axis coordinate system which rotates in synchronization with rotation of the motor, a phase of the rectangular wave voltage is calculated based upon a q-axis current deviation between the q-axis current and a q-axis current command value and the rectangular wave voltage is generated having the phase having been calculated from a DC source.

DETAILED DESCRIPTION OF THE PREFERRED EMBODIMENT

Figure 1:
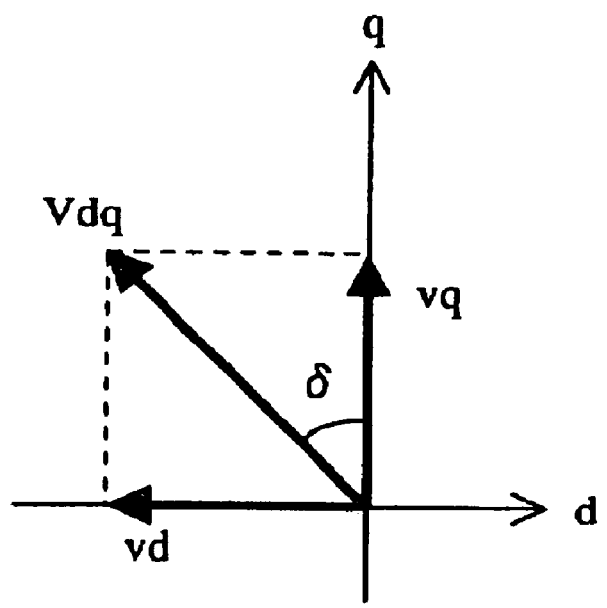
FIG. 1 shows the relationship between dq-axis voltages vd and vq and a rectangular wave voltage phase δ.

The circuit equation in a dq-axis coordinate system which rotates in synchronization with the rotation of a permanent magnet synchronous motor can be expressed as in (1) below.

$$\begin{bmatrix} Vd \\ Vq \end{bmatrix} = \begin{bmatrix} R & -Lq\omega e \\ Ld\omega & R \end{bmatrix} \begin{bmatrix} id \\ iq \end{bmatrix} + \begin{bmatrix} Ld & 0 \\ 0 & Lq \end{bmatrix} \begin{bmatrix} pid \\ piq \end{bmatrix} + \begin{bmatrix} 0 \\ \omega e\phi \end{bmatrix} \quad (1)$$

In expression (1) vd represents a d-axis voltage, vq represents aq-axis voltage, Ld represents ad-axis inductance, Lq represents a q-axis inductance, R represents an armature resistance, ωe represents an electrical angular speed of the motor, id represents a d-axis current equivalent to the field current at the motor, iq represents aq-axis current equivalent to the torque current at the motor, φ represents the number of magnetic flux interlinkages attributable to the permanent magnet and p represents a differential operator.

In a steady state in which the motor load, i.e., the current, remains substantially constant, expression (1) may be approximated to (2).

$$\begin{bmatrix} Vd \\ Vq \end{bmatrix} = \begin{bmatrix} R & -Lq\omega e \\ Ld\omega & R \end{bmatrix} \begin{bmatrix} id \\ iq \end{bmatrix} + \begin{bmatrix} 0 \\ \omega e\phi \end{bmatrix} \quad (2)$$

When the motor is rotating at high speed, the voltage attributable to the armature resistance R, the d-axis current id and the q-axis current iq does not have as much influence as the voltage attributable to the d-axis inductance Ld, the q-axis inductance Lq, the d-axis current id and the q-axis current iq. Thus, expression (2) can be further approximated to (3) below.

$$\begin{bmatrix} Vd \\ Vq \end{bmatrix} = \begin{bmatrix} 0 & -Lq\omega e \\ Ld\omega & 0 \end{bmatrix} \begin{bmatrix} id \\ iq \end{bmatrix} + \begin{bmatrix} 0 \\ \omega e\phi \end{bmatrix} \quad (3)$$

vd and vq may be expressed as in (4) and (5) below by using a rectangular wave voltage phase δ and FIG. 1 illustrates the relationship as expressed in (4) and (5).

$$vd = -Vdq \cdot \sin \delta \quad (4)$$

$$vq = Vdq \cdot \cos \delta \quad (5)$$

Vdq in expression (4) and (5) indicates the size of the voltage vector (hereafter simply referred to as a dq-axis voltage) in the dq-axis coordinate system, which can be expressed as in (6) below by using the DC source voltage (DC link voltage) Vdc of the inverter when the motor is driven with a rectangular wave voltage.

$$Vdq = \sqrt{(6)} \cdot Vdc/\pi \quad (6)$$

In the following expression (7) is derived by using expression (3) and expression (4).

$$iq = Vdq \cdot \sin\delta / Lq \cdot \omega e \quad (7)$$

Expression (7) indicates that when the motor is rotating at high speed in a steady state, the q-axis current iq changes sinusoidally relative to the voltage phase δ. In addition, since iq increases monotonously relative to δ when δ is within the range of $-\pi/2$ to $\pi/2$, the q-axis current which is the torque current can be controlled by manipulating δ.

Accordingly, a control method for adjusting the motor torque by controlling the q-axis current iq which is the torque current through manipulation of the voltage phase δ is explained below.

(First Embodiment)

Figure 2:
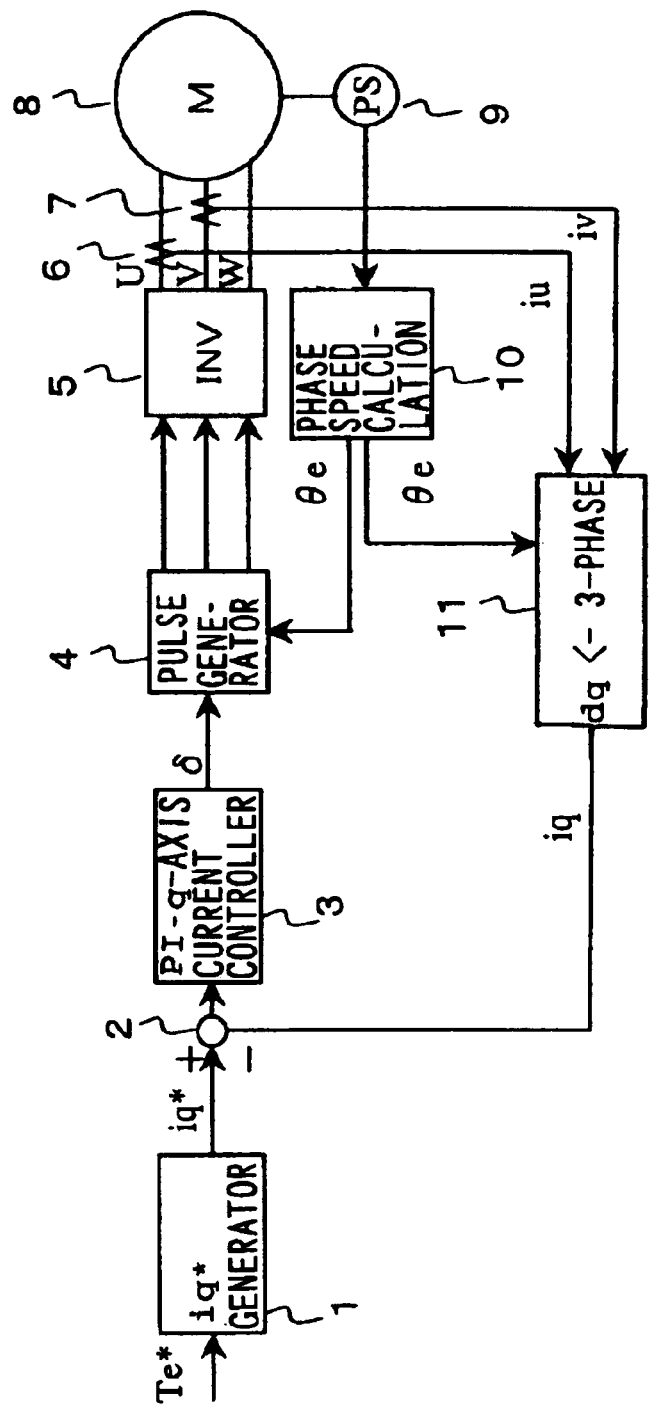
FIG. 2 shows the structure adopted in the motor control apparatus achieved in a first embodiment.

FIG. 2 shows the structure of the motor control apparatus achieved in the first embodiment of the present invention. An iq* generator 1 generates a q-axis current command value iq* in correspondence to a torque command value Te* for a synchronous motor 8. The iq* generator 1 may be constituted as, for instance, a map of iq* in which the torque and the motor speed are used as variables.

A phase speed calculator 10 calculates through an arithmetic operation the electrical rotational speed ωe and an electrical rotational angle θe of the motor 8 based upon the mechanical rotational angle of the synchronous motor 8 detected with a position sensor 9 which may be a resolver. A dq←3-phase converter 11 determines the q-axis current iq through a coordinate conversion of 3-phase AC currents iu, iv and iw executed by using expression (8) presented below.

$$\begin{bmatrix} id \\ iq \end{bmatrix} = \sqrt{\frac{2}{3}} \begin{bmatrix} \cos\theta e & \sin\theta e \\ -\sin\theta e & \cos\theta e \end{bmatrix} \begin{bmatrix} 1 & -1/2 & -1/2 \\ 0 & \sqrt{3}/2 & -\sqrt{3}/2 \end{bmatrix} \begin{bmatrix} iu \\ iv \\ iw \end{bmatrix} \quad (8)$$

It is to be noted that the U-phase current iu and the V-phase current iv are respectively detected with current sensors 6 and 7. In addition, the W-phase current iw is calculated by using the following expression (9).

$$iw = -iu - iv \quad (9)$$

A subtractor 2 and a PI q-axis current controller 3 are employed to implement feedback control of the q-axis current iq. A subtractor 9 calculates the difference (iq*−iq) between the q-axis current command value iq* calculated by the iq* generator 1 and the q-axis current iq. The PI q-axis current controller 3 determines the phase δ of the rectangular wave voltage through PI control (proportional integral control) so as to reduce the q-axis current deviation (iq*−iq) to 0.

Figure 3:
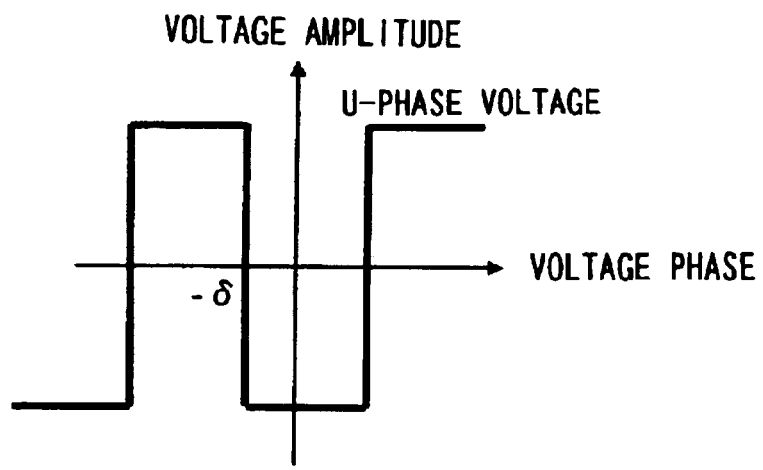
FIG. 3 shows the waveform of a U-phase rectangular wave voltage.
Figure 4:
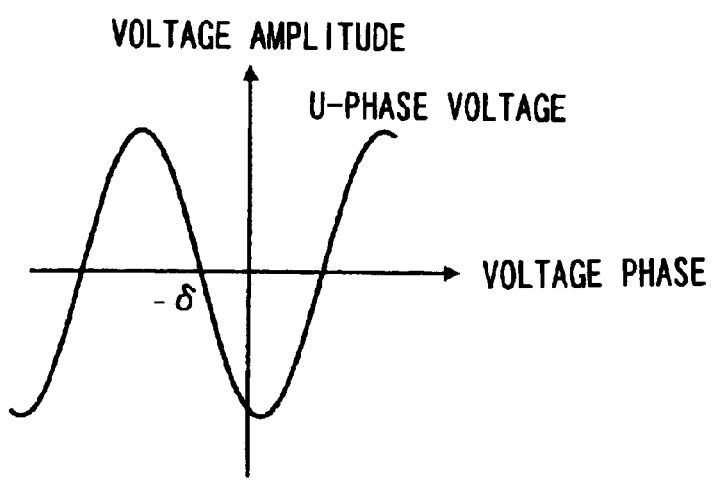
FIG. 4 shows the waveform of a U-phase sine wave PWM voltage.

FIG. 3 shows the relationship between the phase δ of the rectangular wave voltage and the voltage amplitude, which is achieved when the motor is driven with the rectangular wave voltage. It is to be noted that the relationship between the phase δ of the sine wave PWM voltage and the voltage amplitude achieved when the motor is driven with a sine wave PWM voltage is shown in FIG. 4.

A pulse generator 4 generates a 3-phase rectangular wave voltage to be applied to the motor 8 based upon the rectangular wave voltage phase δ and the electrical rotational angle θe of the synchronous motor 8. In standard vector control through which the d-axis current and the q-axis current are controlled independently of each other, the d-axis voltage vd and the q-axis voltage vq are converted to 3-phase AC voltages vu, vv and vw through a coordinate conversion based upon the following expression (10).

$$\begin{bmatrix} Vu \\ Vv \\ Vw \end{bmatrix} = \sqrt{\frac{2}{3}} \begin{bmatrix} \cos\theta e & -\sin\theta e \\ \cos(\theta e - 2/3\pi) & -\sin(\theta e - 2/3\pi) \\ \cos(\theta e + 2/3\pi) & -\sin(\theta e + 2/3\pi) \end{bmatrix} \begin{bmatrix} Vd \\ Vq \end{bmatrix} \quad (10)$$

By incorporating expressions (4) and (5) in expression (10), expression (11) below is obtained.

$$\begin{bmatrix} Vu \\ Vv \\ Vw \end{bmatrix} = -Vdq \sqrt{\frac{2}{3}} \begin{bmatrix} \sin(\theta e + \delta) \\ \sin(\theta e + \delta - 2/3\pi) \\ \sin(\theta e + \delta + 2/3\pi) \end{bmatrix} \quad (11)$$

It is to be noted that while expression (11) indicates that the voltage applied to the motor 8 is a sine wave voltage, a 3-phase rectangular wave voltage corresponding to the sign of the sine wave is applied to the motor 8 when the motor is driven with a rectangular wave voltage.

An inverter 5 drives a switching element in conformance to a rectangular wave voltage command generated at the pulse generator 4, generates a 3-phase rectangular wave voltage with the phase δ from a DC source (DC link) and applies the 3-phase rectangular wave voltage to the motor 8.

When operating the inverter 5 through rectangular wave voltage control, a fundamental wave voltage which is higher by a factor of 27.3% than the fundamental wave voltage in sine wave PWM voltage control can be applied to the motor. In addition, while there is a method of improving the rate of voltage utilization by superimposing a tertiary higher harmonic wave on a sine wave is known in the related art, a fundamental wave voltage higher than the fundamental wave voltage achieved in this method by a factor of 10.3% can be applied to the motor by operating the inverter 5 through the rectangular wave voltage control in this embodiment.

As described above, the motor control apparatus achieved in the first embodiment feeds back the q-axis current iq to the q-axis current command value iq*, determines the rectangular wave voltage phase δ by implementing PI control to reduce the q-axis current deviation (iq*−iq) to 0 and applies the 3-phase rectangular wave voltage with the phase δ to the motor. As a result, a higher fundamental wave voltage than that in sine wave PWM voltage drive can be utilized and the motor output in the high speed range is increased. In addition, since the q-axis current equivalent to the torque current can be controlled with a high degree of accuracy, the accuracy of the torque control improves as well.

(Second Embodiment)

In the first embodiment, the q-axis current iq is fed back to the q-axis current command value iq* and PI control is executed on the deviation (iq*−iq). In this case, if the control cycle lengthens, it becomes difficult to set the PI control gains (the proportional P gain and the integral I gain) to high values and thus, the response in the q-axis current control is lowered. Accordingly, the motor control apparatus achieved in the second embodiment includes a feed-forward compensator as an addition to the structure adopted in the motor control apparatus in the first embodiment to improve the response of the q-axis current control.

Figure 5:
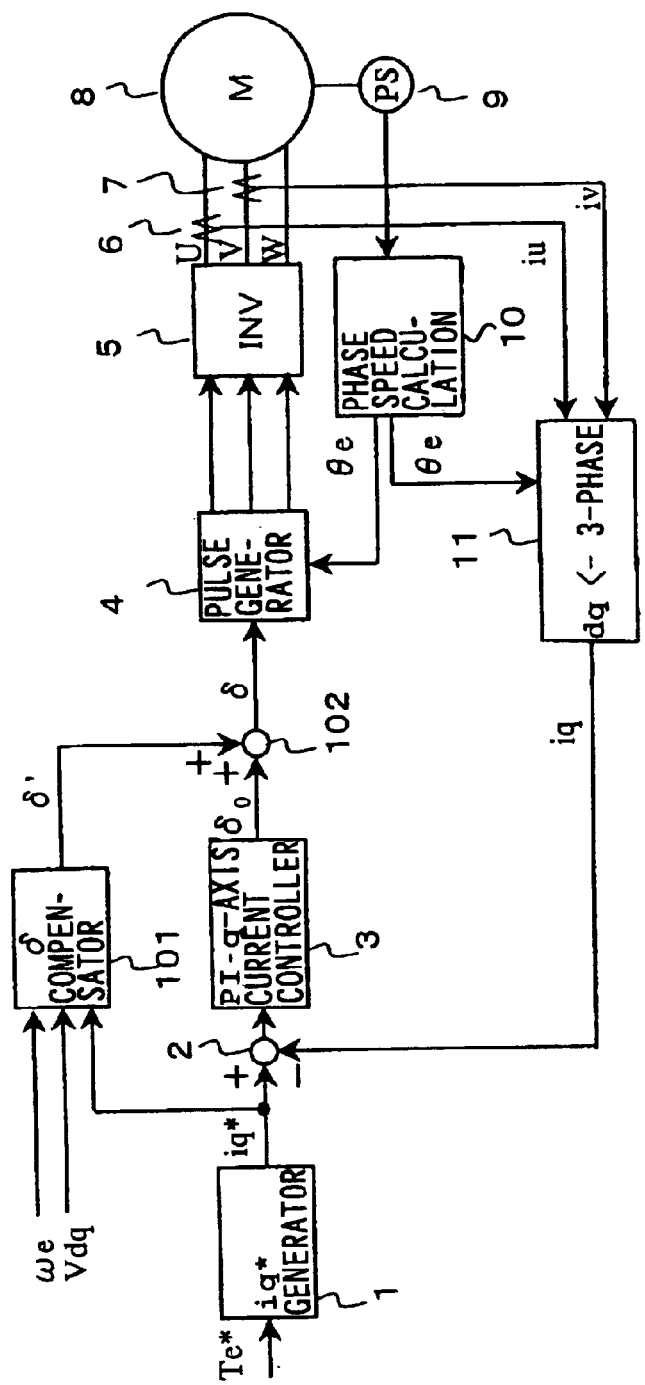
FIG. 5 shows the structure adopted in the motor control apparatus achieved in a second embodiment.

FIG. 5 shows the structure adopted in the motor control apparatus in the second embodiment. It is to be noted that the same reference numerals are assigned to components similar to those in the motor control apparatus in the first embodiment shown in FIG. 2 to preclude the necessity for a repeated explanation thereof.

A feed-forward δ compensator 101 determines a compensating phase δ' to be used to compensate a rectangular wave voltage phase δ 0 calculated at the PI q-axis current controller 3 based upon the electrical angular speed ωe of the motor 8, the dq-axis voltage Vdq and the q-axis current command value iq*. An adder 102 determines the rectangular wave voltage phase δ by calculating the sum of the rectangular wave voltage phase δ 0 calculated by the PI q-axis current controller 3 and the rectangular wave voltage compensating phase δ' calculated by the δ compensator 101.

The structure of the δ compensator 101 is now explained in detail. Based upon the relationship among the rectangular wave voltage phase δ, the dq-axis voltage Vdq, the electrical angular speed ωe of the motor 8 and the q-axis current iq expressed in (7), the compensation value δ' with which the rectangular wave voltage phase is to be compensated is determined through expression (12) below by approximating sin δ to δ and using the q-axis current command value iq*, the electrical angular speed ωe of the motor and the dq-axis voltage Vdq.

$$\delta' = Lq\omega e \cdot iq^* / Vdq \tag{12}$$

The dq-axis voltage Vdq in expression (12) can be determined based upon the DC source voltage (DC link voltage) Vdc at the inverter 5 and expression (6).

It is to be noted that the motor control apparatus in the second embodiment assumes a structure identical to that of the motor control apparatus in the first embodiment shown in FIG. 2 except for the structural change resulting from adding the δ compensator 101 and the adder 102. Namely, the subtractor 2 and the PI q-axis current controller 3 determine the rectangular wave voltage phase δ 0 by implementing PI control so as to reduce the q-axis current deviation (iq*−iq) to 0. The pulse generator 4 generates a 3-phase rectangular wave voltage command for the 3-phase rectangular wave voltage to be applied to the motor 8 based upon the rectangular wave voltage phase δ and the electrical rotational angle ωe of the motor 8. The inverter 5 drives the motor 8 by applying the 3-phase rectangular wave voltage with the phase δ to the synchronous motor 8.

The motor control apparatus achieved in the second embodiment feeds back the q-axis current iq to the q-axis current command value iq* and determines the rectangular wave voltage phase δ 0 by implementing the PI control so as to reduce the q-axis current deviation (iq*−iq) to 0. The motor control apparatus also determines the compensating phase δ' with which the rectangular wave voltage phase is to be compensated based upon the q-axis current command value iq*, the electrical angular speed ωe of the motor 8 and the dq-axis voltage Vdq by employing the feed-forward δ compensator 101. Next, it calculates the rectangular wave voltage phase δ by adding the compensating phase δ' to the rectangular wave voltage phase 60 having been calculated and thus generates the 3-phase rectangular wave voltage with the phase δ which is then applied to the motor 8. As a result, it improves the response of the q-axis current control when the control cycle is lengthened as well as achieving the advantages of the motor control apparatus in the first embodiment.

(Third Embodiment)

Figure 6:
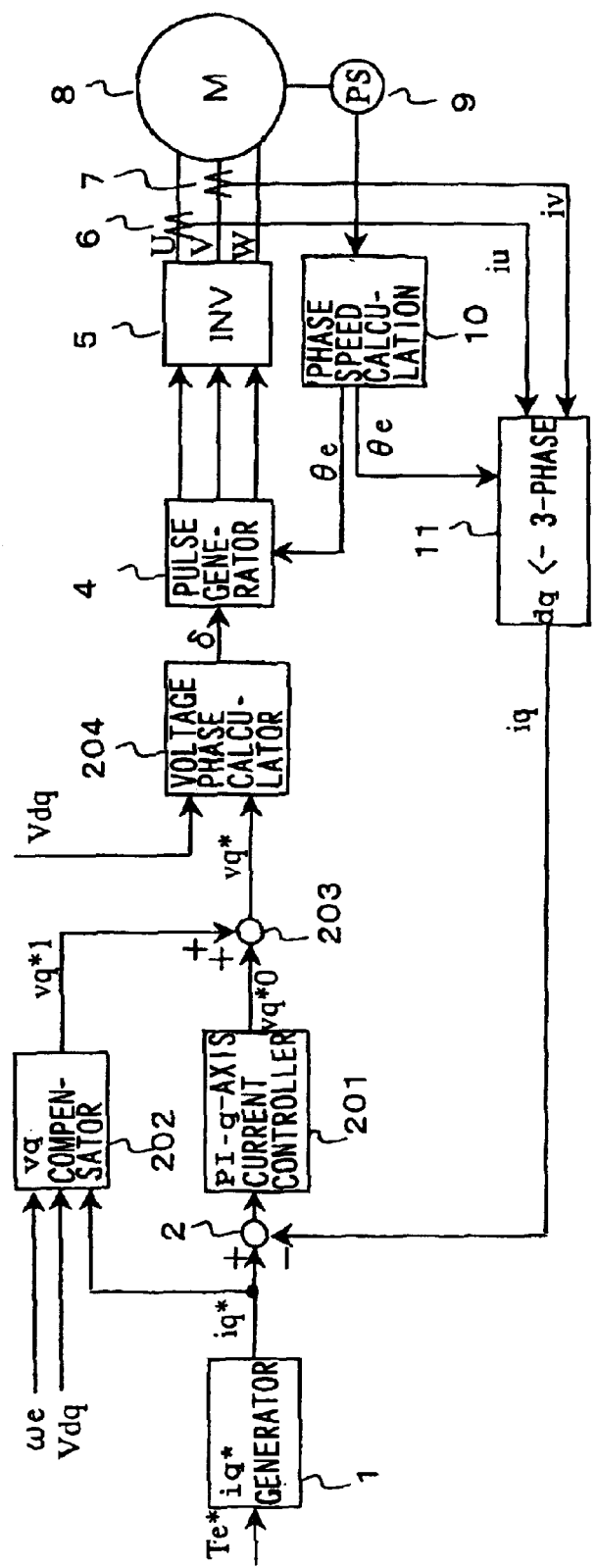
FIG. 6 shows the structure adopted in the motor control apparatus achieved in a third embodiment.

FIG. 6 shows the structure adopted in the motor control apparatus in the third embodiment. It is to be noted that the same reference numerals are assigned to components similar to those in the motor control apparatuses shown in FIGS. 2 and 5 to preclude the necessity for a repeated explanation thereof.

A PI q-axis current controller 201 obtains a q-axis voltage command value vq*0 which will reduce the q-axis current deviation (iq*−iq) to 0 by executing PI control on the difference (iq*−iq) between the q-axis current command value iq* and the q-axis current iq ascertained by the subtractor 2. A feed-forward vq compensator 202 calculates a compensating voltage vq*1 with which the q-axis voltage command value vq*0 is to be compensated, based upon the q-axis current command value iq*, the electrical angular speed ωe of the motor 8 and the dq-axis voltage Vdq.

The structure of the vq compensator 202 is now explained in detail. The following expression (13) is derived from the relationship among the d-axis voltage vd, the q-axis voltage vq and the dq-axis voltage Vdq illustrated in FIG. 1 and expression (3).

$$vq = \sqrt{(Vdq^2 - Lq^2 iq^{*2} \omega e^2)} \tag{13}$$

The vq compensator 202 outputs the q-axis voltage vq calculated by using expression (13) as a q-axis compensating voltage command value vq*1.

An adder 203 determines a q-axis voltage command value vq* as the sum of the q-axis voltage command value vq*0 calculated by the PI q-axis current controller 201 and the q-axis compensating voltage command value vq*1 calculated by the vq compensator 202. A voltage phase calculator 204 calculates the rectangular wave voltage phase δ through the following expression (14) by using the q-axis voltage command value vq* and the dq-axis voltage Vdq based upon the relationship illustrated in FIG. 1.

$$\delta = \cos^{-1}(vq^*/Vdq) \tag{14}$$

The rectangular wave voltage phase δ calculated by the voltage phase calculator 204 is output to the pulse generator 4. The pulse generator 4 generates a 3-phase rectangular wave voltage to be applied to the motor 8 based upon the rectangular wave voltage phase δ and the electrical rotational angle θe of the motor 8. The inverter 5 drives the motor 8 by applying the 3-phase rectangular wave voltage with the phase δ to the synchronous motor 8.

The motor control apparatus achieved in the third embodiment calculates the voltage to be applied to the motor through the following method. First, the q-axis voltage command value vq*0 is determined by executing the PI control on the q-axis current deviation (iq*−iq) and the q-axis compensating voltage command value vq*1 is calculated by the vq compensator 202 based upon the q-axis current command value iq*, the electrical angular speed ωe at the motor 8 and the dq-axis voltage Vdq. Then, the compensating voltage command value vq*1 is added to the q-axis voltage command value vq*0 and thus, the q-axis voltage command value vq* is determined. Based upon the q-axis voltage command value vq* and the dq-axis voltage Vdq, the rectangular wave voltage phase δ is calculated, and the 3-phase rectangular wave voltage with the phase δ is applied to the motor 8. As a result, the motor control apparatus in the third embodiment achieves the following advantages as well as advantages similar to those of the motor control apparatuses in the first and second embodiments. Namely, since the compensating voltage vq*1 to be used to compensate the q-axis voltage command value vq*0 is calculated through feed-forward control, the response of the q-axis current to any changes in the rotational speed of the motor 8 and the q-axis current command value iq* is improved.

In addition, the motor control apparatus in the third embodiment, which determines the rectangular wave voltage phase δ based upon the q-axis voltage vq and Vdq which is calculated in correspondence to the DC source voltage (DC link voltage) Vdc at the inverter 5, is capable of controlling the q-axis current iq with fast response even when the DC source voltage (DC link voltage) Vdc at the inverter 5 fluctuates. In other words, better response in the torque control is achieved.

Furthermore, since the PI q-axis current controller 201 in the motor control apparatus in the third embodiment can be achieved by using a controller adopting a structure similar to the structure of a controller that implements regular vector control, the motor control apparatus in the third embodiment can be achieved with ease by modifying or improving on the motor control apparatus that implements standard vector control.

(Fourth Embodiment)

As explained earlier, expression (3) is obtained by approximating the circuit equation (in expression (1)) of a permanent magnet synchronous motor in the dq-axis coordinate system by assuming a restricted operating state for the motor, i.e., a state in which the motor is rotating steadily at high speed. By expanding expression (3), expression (15) and (16) below are obtained.

$$vd = -Lq\omega e \cdot iq \qquad (15)$$

$$vq = Ld\omega e \cdot id + \omega e \phi \qquad (16)$$

Namely, as expression (15) clearly indicates, when the motor is rotating at high speed in a steady state, the q-axis current iq equivalent to the motor torque current can be controlled by using the d-axis voltage vd.

In addition, as expression (16) indicates, when the motor is rotating at high speed in a steady state, the q-axis voltage vq can be reduced by reducing the d-axis current id. Also, the relationship between the d-axis voltage vd and the q-axis voltage vq illustrated in FIG. 1 clearly indicates, the d-axis voltage vd can be increased by lowering the q-axis voltage vq. Expression (15) indicates that the q-axis current iq can be increased by raising the d-axis voltage vd. In other words, as the d-axis current id is reduced, the q-axis current iq equivalent to the torque current increases. By using these relationships to advantage, the torque can be controlled with a higher degree of accuracy.

The motor control apparatus in the fourth embodiment calculates the rectangular wave voltage phase δ based upon the relationships described above. First, in a q-axis current feedback control system the d-axis current command value id* is determined through PI control executed on the q-axis current deviation (iq*−iq) with a control gain set at a negative value. Next, in a d-axis feed back control system the d-axis voltage command value vd* is determined by executing PI control on the d-axis current deviation (id*−id), and the rectangular wave voltage phase δ is determined based upon the d-axis voltage command value vd* and the dq-axis voltage Vdq.

Figure 7:
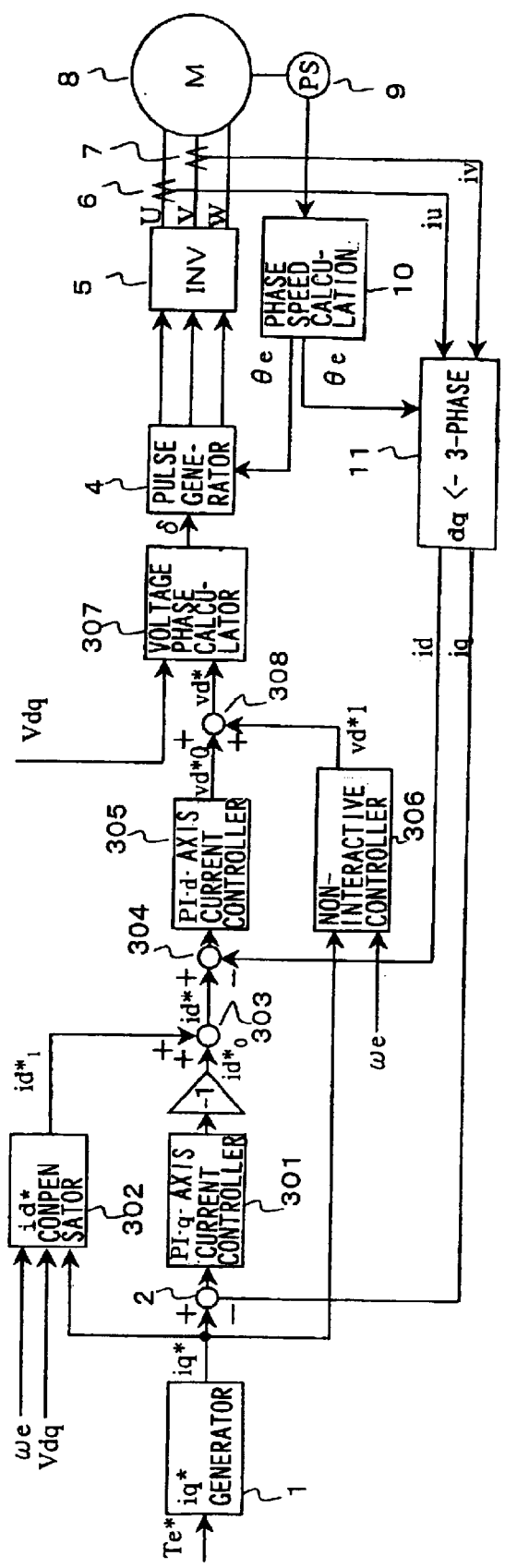
FIG. 7 shows the structure adopted in the motor control apparatus achieved in a fourth embodiment.

FIG. 7 shows the structure adopted in the motor control apparatus in the fourth embodiment. It is to be noted that the same reference numerals are assigned to components similar to those in the motor control apparatuses shown in FIGS. 2, 5 and 6 and the following explanation focuses on the difference from the previous embodiments.

A PI q-axis current controller 301 calculates a d-axis current command value id*0 by multiplying the output obtained by executing PI control on the q-axis current deviation (iq*−iq) by a gain "−1".

In addition, since the d-axis current command value id*0 will be delayed if the q-axis current feed back control alone is executed, an id* compensator 302, which is a feed-forward compensator, is provided to compensate for the delay. The id* compensator 302 determines a compensating current id*1 to be used to compensate the d-axis current command value id*0 based upon the q-axis current command value iq*, the electrical rotational speed ωe of the motor 8 and the dq-axis voltage Vdq. The following expression (17) is derived from the relationship among the d-axis voltage vd, the q-axis voltage vq and the dq-axis voltage Vdq illustrated in FIG. 1 and expression (3).

$$id = 1/Ld(-\phi + \sqrt{(Vdq^2/\omega e^2 - Lq^2 iq^2)}) \qquad (17)$$

The id* compensator 302 uses the q-axis current command value iq* as a substitute for the q-axis current iq in expression (17) and outputs the d-axis current id resulting from the calculation as a d-axis compensating current command value id*1.

An adder 303 determines the d-axis current command value id* by calculating the sum of the d-axis current command value id*0 calculated by the PI q-axis current controller 301 and the d-axis compensating current command value id*1 calculated by the id* compensator 302.

A subtractor 304 and a PI d-axis current controller 305 implement feedback control on the d-axis current id. It is to be noted that the d-axis current id and the q-axis current iq are obtained by executing a coordinate conversion on the 3-phase AC currents iu, iv and iw based upon expression (8). The coordinate conversion is executed by the dq←3-phase converter 11.

The subtractor 304 calculates the difference (id*−id) between the d-axis current command value id* and the d-axis current id. Next, the PI d-axis current controller 305 determines a d-axis voltage command value vd*0 by executing PI control so as to reduce the d-axis current deviation (id*−id) to 0.

Since the voltage generated by the q-axis current acts as a disturbance factor in the d-axis current control, a non-interactive controller 306 is provided to compensate for the disturbance voltage. The non-interactive controller 306 calculates the d-axis voltage vd by using expression (15) based upon the q-axis current command value iq* and the electrical angular speed ωe of the motor 8 and outputs the d-axis voltage vd as a compensating voltage vd*1 with which the d-axis voltage command value vd*0 is to be compensated. An adder 308 calculates the d-axis voltage command value vd* by adding the d-axis compensating voltage vd*1 calculated by the non-interactive controller 306 to the d-axis voltage command value vd*0 calculated by the PI d-axis current controller 305.

A voltage phase calculator 307 calculates the rectangular wave voltage phase δ through the following expression (18) based upon the d-axis voltage command value vd* and the dq-axis voltage Vdq having the relationship illustrated in FIG. 1.

$$\delta = \sin^{-1}(-vd^*/Vdq) \qquad (18)$$

The rectangular wave voltage phase δ calculated by the voltage phase calculator 307 is output to the pulse generator 4. The pulse generator 4 generates a 3-phase rectangular wave voltage to be applied to the motor 8 based upon the rectangular wave voltage phase δ and the electrical rotational angle θe of the motor 8. The inverter 5 drives the motor 8 by applying the 3-phase rectangular wave voltage with the phase δ to the motor 8.

The motor control apparatus in the fourth embodiment ensures that the q-axis current iq conforms to the command value iq* by controlling the phase δ of the rectangular wave voltage. As a result, the motor torque can be controlled with a high degree of accuracy and, at the same time, the motor torque response is improved.

The extent to which the q-axis current iq changes relative to the d-axis current id is smaller than the extent to which the d-axis current id changes relative to the q-axis current iq. Based upon this premise, the q-axis current iq at the motor being driven in a steady state can be sustained with a high degree of stability and accuracy by executing a feed back control of the d-axis current id when the detected current contains noise or when a current ripple is detected. At the same time, since the extent to which the q-axis current iq changes is not as significant as the change in the d-axis current id, the id* compensator 302 and the non-interactive controller 306 explained earlier are needed to improve the response of the q-axis current iq.

Furthermore, since the PI d-axis current controller 305 and the non-interactive controller 306 in the motor control apparatus in the fourth embodiment can be achieved by using controllers adopting a structure similar to the structure of the controller that implements regular vector control, the motor control apparatus in the fourth embodiment can be achieved with ease by modifying or improving on the motor control apparatus that implements standard vector control.

Figure 8:
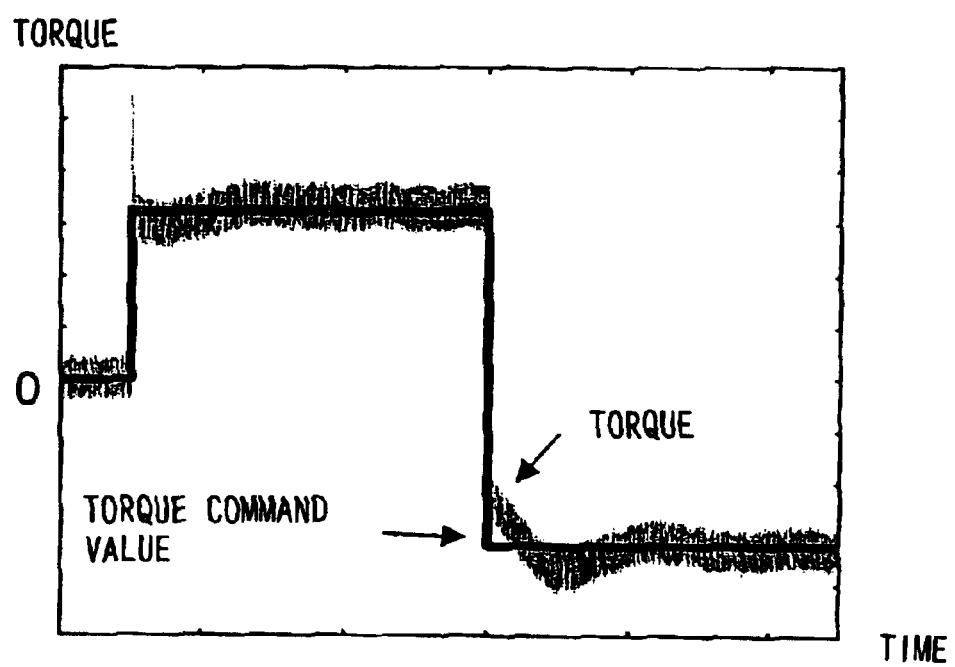
FIG. 8 shows the results of a torque response simulation executed by using the motor control apparatus in the fourth embodiment.

FIG. 8 presents the results of a torque response simulation executed by using the motor control apparatus achieved in the fourth embodiment. As the simulation results clearly indicate, the motor torque is made to conform to the command value with a high degree of accuracy even though the motor torque contains a torque ripple.

The above described embodiments are examples, and various modifications can be made without departing from the spirit and scope of the invention. For instance, an explanation is given above in reference to the first to fourth embodiments on an example in which the circuit equation of the motor in the dq-axis coordinate system is approximated by restricting the motor operating state to a high-speed steady state and the rectangular wave voltage drive is implemented based upon the approximated expression (see expression (3)). While the motor may be driven with the rectangular wave voltage described above alone, it is more desirable to switch to the sine wave PWM voltage drive in the related art to control the motor when the motor is rotating at low speed. The sine wave PWM voltage drive control and the switching control between the sine wave PWM voltage drive and rectangular wave voltage drive should be implemented through any of the various control methods proposed in the related art.

Moreover, while the PI q-axis current controllers 2, 201 and 301 implement PI control on the q-axis current deviation (iq*−iq), PID control may be executed instead of the PI control.

The disclosure of the following priority application is herein incorporated by reference:
Japanese Patent Application No. 2003-78181 filed Mar. 20, 2003.

What is claimed is:

1. A motor control apparatus that drives a 3-phase synchronous motor by applying a 3-phase rectangular wave voltage to the 3-phase synchronous motor, comprising:
   a current detection device that detects a current flowing to the synchronous motor;
   a current conversion device that converts through a coordinate conversion the current detected by the current detection device to a d-axis current and a q-axis current in a dq-axis coordinate system which rotates in synchronization with rotation of the motor;
   a phase calculation device that calculates a phase of the rectangular wave voltage based upon a q-axis current deviation between a q-axis current command value and the q-axis current; and
   a power conversion device that generates the rectangular wave voltage having the phase calculated by the phase calculation device from a DC source.

2. A motor control apparatus according to claim 1, wherein:
   the phase calculation device calculates the phase of the rectangular wave voltage by executing PI control or PID control so as to reduce the q-axis current deviation to 0.

3. A motor control apparatus according to claim 2, further comprising:
   a speed detection device that detects a rotational speed of the motor; and
   a phase compensating device that compensates the phase of the rectangular wave voltage based upon the q-axis current command value, a voltage of the DC source at the power conversion device and the rotational speed of the motor.

4. A motor control apparatus according to claim 1, wherein:
   the phase calculation device calculates a q-axis voltage command value by executing PI control or PID control so as to reduce the q-axis current deviation to 0 and calculates the phase based upon the q-axis voltage command value and a voltage of the DC source at the power conversion device.

5. A motor control apparatus according to claim 4, further comprising:
   a speed detection device that detects a rotational speed of the motor; and
   a voltage compensating device that compensate the q-axis voltage command value based upon the q-axis current command value, the voltage of the DC source at the power conversion device and the rotational speed of the motor.

6. A motor control apparatus according to claim 1, wherein:
   the phase calculation device includes a device that calculates a d-axis current command value by executing PI control or PID control so as to reduce the q-axis current deviation to 0, a device that calculates a d-axis voltage command value based upon the d-axis current command value and the d-axis current and a device that calculates the phase of the rectangular wave voltage based upon the d-axis voltage command value and a voltage of the DC source at the power conversion device.

7. A motor control apparatus according to claim 6, further comprising:
   a speed detection device that detects a rotational speed of the motor; and
   a current compensating device that compensates the d-axis current command value based upon the q-axis current command value, the voltage of the DC source at the power conversion device and the rotational speed of the motor.

8. A motor control apparatus according to claim 6, further comprising:
   a speed detection device that detects a rotational speed of the motor; and
   a voltage compensating device that compensates the d-axis voltage command value based upon the q-axis current command value and the rotational speed of the motor.

9. A motor control apparatus that drives a 3-phase synchronous motor by applying a 3-phase rectangular wave voltage to the 3-phase synchronous motor, comprising:
   a current detection means for detecting a current flowing to the synchronous motor;
   a current conversion means for converting through a coordinate conversion the current detected by the current detection means to a d-axis current and a q-axis current in a dq-axis coordinate system which rotates in synchronization with rotation of the motor;
   a phase calculation means for calculating a phase of the rectangular wave voltage based upon a q-axis current deviation between a q-axis current command value and the q-axis current; and
   a power conversion means for generating the rectangular wave voltage having the phase calculated by the phase calculation means from a DC source.

10. A motor control method for driving a 3-phase synchronous motor by applying a 3-phase rectangular wave voltage, comprising:

detecting a current flowing to the synchronous motor;
    converting through a coordinate conversion the detected current to a d-axis current and a q-axis current in a dq-axis coordinate system which rotates in synchronization with rotation of the motor;
    calculating a phase of the rectangular wave voltage based upon a q-axis current deviation between the q-axis current resulting from the coordinate conversion and a q-axis current command value; and
    generating the rectangular wave voltage having the phase having been calculated from a DC source.

* * * * *